United States Patent [19]
Nishikiori

[11] Patent Number: 5,945,228
[45] Date of Patent: Aug. 31, 1999

[54] MAGNETO-OPTICAL RECORDING MEDIUM AND METHOD FOR REPRODUCING THEREOF

[75] Inventor: Keiji Nishikiori, Osaka, Japan

[73] Assignee: Matsushita Electric Industrial Co., Ltd., Osaka, Japan

[21] Appl. No.: 08/843,059

[22] Filed: Apr. 16, 1997

[30] Foreign Application Priority Data

Apr. 23, 1996 [JP] Japan ..................................... 8-101320

[51] Int. Cl.$^6$ ....................................................... G11B 5/66
[52] U.S. Cl. ......................... 428/694 ML; 428/694 MM; 428/694 EC; 428/900; 369/13; 369/14; 369/110; 369/112; 369/283; 369/284; 369/286; 360/114
[58] Field of Search .................... 428/694 ML, 694 MM, 428/694 EC, 900; 369/13, 14, 110, 112, 283, 284, 286; 360/114

[56] References Cited

U.S. PATENT DOCUMENTS

| | | | |
|---|---|---|---|
| 5,428,585 | 6/1995 | Hirokane et al. | 369/13 |
| 5,457,582 | 10/1995 | Victora et al. | 360/59 |
| 5,463,578 | 10/1995 | Gambino et al. | 365/122 |
| 5,503,924 | 4/1996 | Osato | 428/336 |

FOREIGN PATENT DOCUMENTS

| | | |
|---|---|---|
| 05089536 | 4/1993 | Japan . |
| 5-81717 | 4/1993 | Japan . |
| 5-89536 | 4/1993 | Japan . |
| 6-84212 | 3/1994 | Japan . |
| 6-139633 | 5/1994 | Japan . |
| 06251445 | 9/1994 | Japan . |
| 6-251445 | 9/1994 | Japan . |
| 7-161082 | 6/1995 | Japan . |
| 07307040 | 11/1995 | Japan . |
| 7-307040 | 11/1995 | Japan . |

OTHER PUBLICATIONS

Masumi Ota et al., "Development of a magneto–optical disk, realizing more than double high density regeneration with an existing optical system," *Nikkei Electronics*, p. 223 ff, Oct. 28, 1991.

*Primary Examiner*—Leszek Kiliman
*Attorney, Agent, or Firm*—Merchant & Gould P.C.

[57] ABSTRACT

A magneto-optical recording medium comprises: a readout magnetic film which is perpendicular magneto-anisotropy in a temperature range higher than room temperature and less than a second temperature Tsw2, and is in-plane magneto-anisotropy in a temperature range equal to or more than the second temperature Tsw2; an intermediate magnetic film which is in-plane magneto-anisotropy in a temperature range higher than the room temperature; and a recording magnetic film which is perpendicular magneto-anisotropy for holding recording magnetic domains. When the coercive force of the readout magnetic film is Hc, the exchange coupled force between the readout magnetic film and the recording magnetic film is Hs, and the readout magnetic field is Hr, in a temperature range equal to or higher than room temperature and less than a first temperature Tsw1 which is higher than room temperature and is lower than the second temperature Tsw2, a first relation $|Hr|>|Hs+Hc|$ is satisfied, and in a temperature range from the first temperature Tsw1 to the second temperature Tsw2, a second relation $|Hr|<|Hs|-|Hc|$ is satisfied.

3 Claims, 6 Drawing Sheets

MAGNETO-OPTICAL RECORDING MEDIUM AND METHOD FOR REPRODUCING THEREOF

FIELD OF THE INVENTION

This invention relates to a magneto-optical recording medium and a method for reproducing the magneto-optical recording medium wherein data are recorded and erased due to a temperature-rise by laser beam irradiation and the data are reproduced by the magneto-optical effect.

DESCRIPTION OF THE PRIOR ART

In a magneto-optical recording technique, data are recorded on a magnetic film of the magneto-optical recording medium by partially irradiating a laser beam. When a portion of the magnetic film is heated above the Curie temperature or the compensation temperature of the magnetic film by the laser beam irradiation, the portion of the magnetic film is magnetized in the same direction as an external magnetic field. Thus, a recording magnetic domain for recording a datum is formed at that portion.

There are two kinds of magneto-optical recording systems. In a first system called "magnetic field modulation recording system", a laser beam having a predetermined power evenly irradiates a surface of a magneto-optical recording medium for increasing the temperature of a recording magnetic film. An external magnetic field is applied to the recording magnetic film for thermomagnetically recording a datum at a predetermined portion on the recording magnetic film. The direction of the external magnetic field is modulated corresponding to a signal to be recorded.

Alternatively, in a second system called "light power modulation recording system", an external magnetic field having a predetermined intensity is evenly applied to a recording magnetic film of a magneto-optical recording medium. A laser beam irradiates the recording magnetic film for selectively increasing the temperature of a portion of the recording magnetic film for thermomagnetically recording a datum at the portion on the recording magnetic film. The power of the laser beam is modulated corresponding to a signal to be recorded.

Generally, in the magneto-optical recording medium, when the size of the recording magnetic domain is made less than the diameter of a readout beam spot, recording magnetic domains disposed adjacent to the specific recording magnetic domain, which is to be reproduced, are included in the detection region. The intensity of the readout signal from the recording magnetic domain is reduced by the interference of the adjoining recording magnetic domains. Thus, the S/N ratio of the data reproduced from the magneto-optical recording medium is reduced.

Figure 5A:
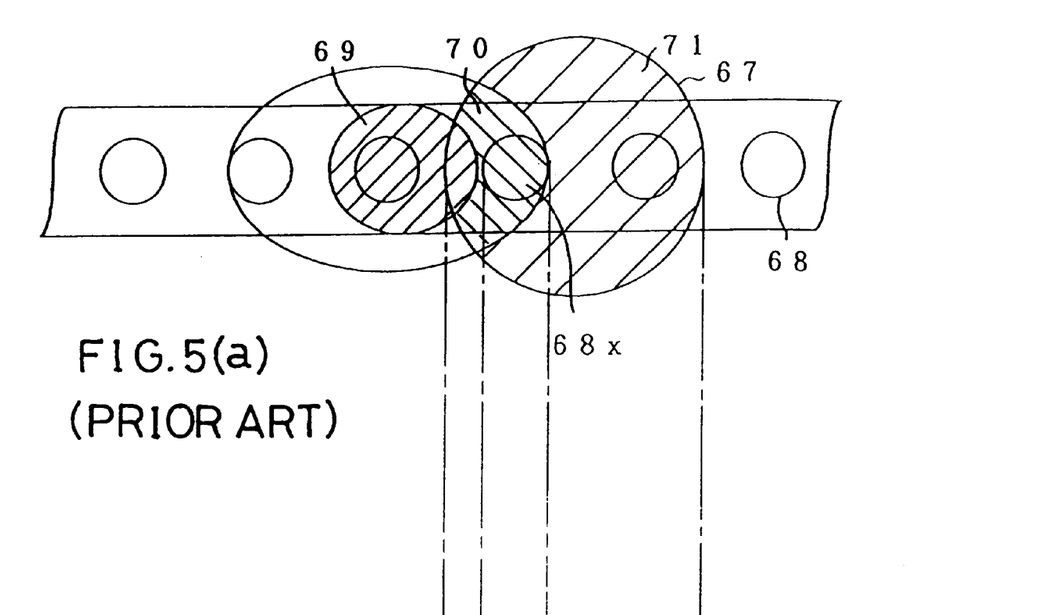
FIG. 5(a) is a plan view a part of a track on a first conventional magneto-optical recording medium, observed from a side for laser beam irradiation.
Figure 5B:
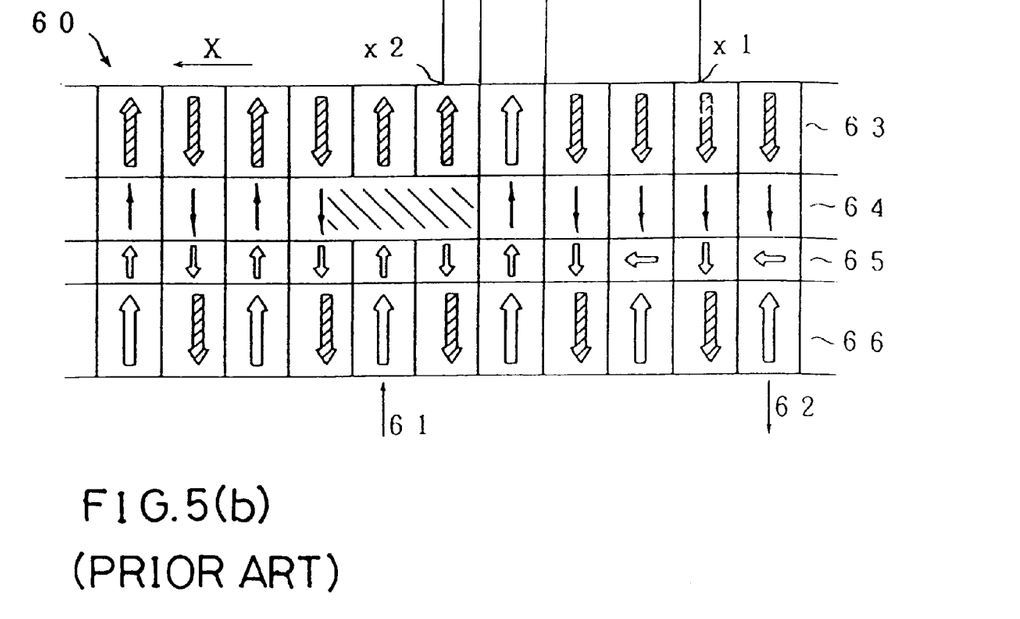
FIG. 5(b) is a cross-sectional side view for showing the multi-layer structure of the first conventional magneto-optical recording medium.

For reproducing the data from the portions smaller than the diameter of the readout beam spot, a first conventional magneto-optical recording medium, which is described, for example, in NIKKEI ELECTRONICS, 1991.10.28 No. 539, has a multi-layer structure including at least two layers respectively having different magnetic characteristics such as coercive forces. The first conventional magneto-optical recording medium is described with reference to FIGS. 5(a) and 5(b). FIG. 5(a) is a plan view showing a part of a track on the magneto-optical recording medium 60, observed from a side for laser beam irradiation. FIG. 5(b) is a cross-sectional side view for showing the multi-layer structure of the magneto-optical recording medium 60.

As can be seen from FIG. 5(b), the magneto-optical recording medium 60 comprises a substrate (not shown in the figure) and a multi-layer structure including a readout magnetic film 63, a copying magnetic film 64, an intermediate magnetic film 65, and a recording layer 66. In FIG. 5(b), arrow X designates the moving direction along the track of the magneto-optical recording medium 60 such as a disc. Arrow 61 designates the direction of an external magnetic field applied for recording the readout data. Arrow 62 designates the direction of an initializing magnetic field for initializing the magneto-optical recording medium 60. When the data on the magneto-optical recording medium 60 is reproduced, a readout beam spot 67 from a laser beam is focused on the track on the magneto-optical recording medium 60.

The copying magnetic film 64 is strongly interacted with the readout magnetic film 63 by the exchange coupled force. The intermediate magnetic film 65 is provided for stabilizing the magnetic walls when the magnetization of the readout magnetic film 63 coincides with that of the recording magnetic film 66. Signals (data) are assumed to be previously thermomagnetically recorded as recording magnetic domains 68 on the recording magnetic film 66.

As can be seen from FIG. 5(a), when the readout beam spot 67 is focused on the rotating magneto-optical recording medium 60, the temperature distribution of each magnetic film such as the readout magnetic film 63 and the copying magnetic film 64 becomes rotationally asymmetric. The center of the temperature distribution moves in a direction shown by arrow X. Specifically, an oval shaped region 69 as shown in FIG. 5(a) in the rear side of the laser beam spot 67 becomes a high temperature region. The temperature of the region 69 becomes higher than the Curie temperature Tc of the copying magnetic film 64. A crescent shaped region 70 outside the high temperature region 69 and overlapping the readout beam spot 67 becomes a middle temperature region. Furthermore, a portion 71 outside the middle temperature region 70 and overlapping the readout beam spot 67 becomes a low temperature region.

The reproducing operation of the magneto-optical recording medium 60 is as follows. First, the magnetization in the readout magnetic film 63 is arranged in the same direction (for example, downward in the figure) by an initializing magnetic field 62. When the laser beam irradiates a region on the rotating magneto-optical recording medium 60 corresponding to the magnetic domains from x1 to x2 in order to reproduce the data, the temperature of the region on the magneto-optical recording medium 60 increases. Thus, the temperature distribution shown in FIG. 5(a) occurs on the magneto-optical recording medium 60. With respect to the readout magnetic film 63, the coercive force is reduced due to the increase of the temperature, so that the exchange coupled force between the readout magnetic film 63 and the recording magnetic film 66 governs in the middle temperature region 70. Thus, the magnetization in the readout magnetic film 63 is arranged in the same direction as the magnetization in the recording magnetic film 66.

On the other hand, in the high temperature region 69 shown in FIG. 5(b) where the temperature of the copying magnetic film 64 is higher than the Curie temperature Tc, the magnetization in the copying magnetic film 64 disappears. When the magnetization disappears, the exchange coupled force between the readout magnetic film 63 and the recording magnetic film 66 will be intercepted. Thus, the magnetization in the readout magnetic film 63 is governed by the readout magnetic field 61, and the magnetization in the readout magnetic film 63 is arranged in the same direction (for example, upward in the figure).

With respect to the direction of the magnetization in the readout magnetic film 63 under the readout beam spot 67, there are three regions. The magnetization in a first region is arranged downward in the figure at all times by the effect of the initializing magnetic field 62. The magnetization in a second high temperature region is arranged upward in the figure at all times by the readout magnetic field 61. The magnetization in a third middle temperature region is arranged in the same direction as the magnetization of the recording magnetic domain 68 in the recording magnetic film 66. In the first and second regions, the magnetization is arranged in the constant direction at all times, so that data cannot be obtained from these regions. In other words, the recording magnetic domains 68 in the low temperature region 71 and the high temperature region 69 under the readout beam spot 76 are masked. The data in the recording magnetic film 66 can be obtained only from a predetermined recording magnetic domain 68x that exists in the middle temperature region 70.

Even when the recording magnetic domain 68 is much smaller than the readout beam spot 67, the recording magnetic domains disposed adjoining the specific recording magnetic domain 68x, which is to be reproduced, are not included in a detecting region. The intensity of the readout signal rarely decreases due to the interference of the adjoining recording magnetic domains. The reduction of the S/N ration of the readout signals can be minimized.

The above-mentioned first conventional magneto-optical recording medium 60, however, needs the initializing magnetic field 62, since the magnetization in the readout magnetic film 63 is arranged in the same direction.

Figure 6A:
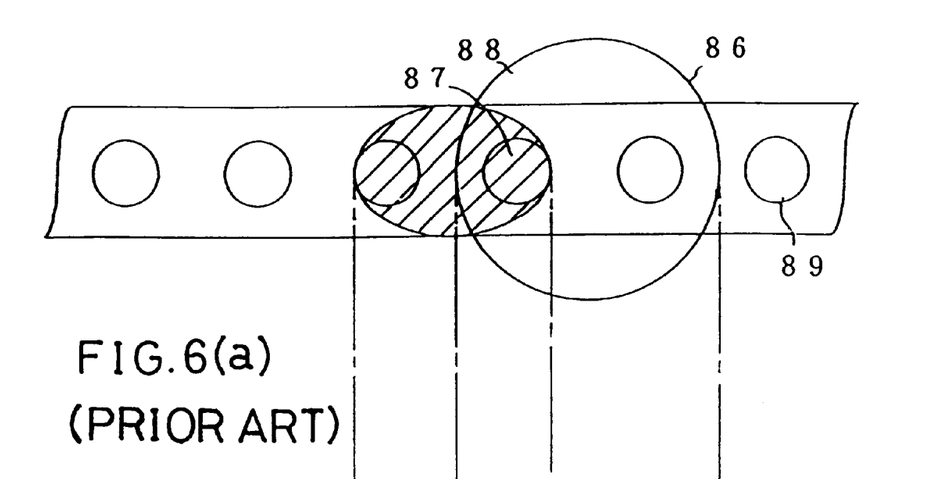
FIG. 6(a) is a plan view showing a part of a track on a second conventional magneto-optical recording medium, observed from a side for laser beam irradiation.
Figure 6B:
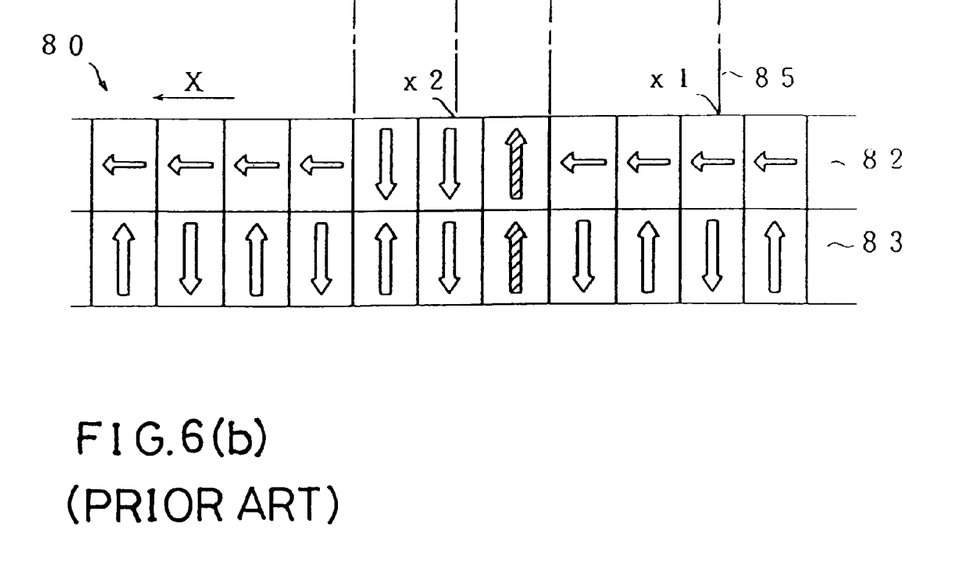
FIG. 6(b) is a cross-sectional side view for showing a multi-layer structure of the second conventional magneto-optical recording medium.

A second conventional magneto-optical recording medium, which does not need any initializing magnetic field, is described, for example, in Publication Gazette of Unexamined Japanese Patent Application Hei 5-81717. The second conventional magneto-optical recording medium is described with reference to FIGS. 6(a) and 6(b). FIG. 6(a) is a plan view showing a part of a track on a magneto-optical recording medium 80, observed from a side for laser beam irradiation. FIG. 6(b) is a cross-sectional side view for showing the multi-layer structure of the magneto-optical recording medium 80.

As can be seen from FIG. 6(b), the magneto-optical recording medium 80 comprises a substrate (not shown in the figure) and a multi-layer structure including a readout magnetic film 82 and a recording magnetic film 83. In FIG. 6(b), arrow X designates the moving direction along the track of the magneto-optical recording medium 80 such as a disc. Instead of the first conventional magneto-optical recording medium 60 shown in FIGS. 5(a) and 5(b), an in-plane magneto-anisotropy film is used as the readout magnetic film 82. Data are previously recorded at each recording magnetic domain 89 in the recording magnetic film 83 by a thermomagnetic recording technique.

As can be seen from FIG. 6(a), when a readout beam spot 86 is focused on the rotating magneto-optical recording medium 80, the temperature distribution of each magnetic film such as the readout magnetic film 82 and the recording magnetic film 83 becomes rotationally asymmetric. The center of the temperature distribution moves in the direction shown by arrow X. Specifically, an oval shaped region 87 (as shown by cross-hatching in FIG. 6(a)) at the rear side of the laser beam spot 86 becomes a high temperature region. In an outer region of the high temperature region 87, a portion further overlapping the readout beam spot 86 becomes a low temperature region. In the second conventional magneto-optical recording medium, the recording magnetic domain 89 is much smaller than the readout beam spot 86.

The reproducing operation of the magneto-optical recording medium 80 is as follows. When the laser beam irradiates a region on the rotating magneto-optical recording medium 80 corresponding to the magnetic domains from x1 to x2 in order to reproduce the data, the temperature of the region of the magneto-optical recording medium 80 increases. The high temperature region 87 and the low temperature region 88 are formed. In the high temperature region 87, the magnetization in the readout magnetic film 82 changes to a perpendicular magneto-anisotropy. Thus, the magnetization in the readout magnetic film 82 is arranged in the same direction as the magnetization in the recording magnetic film 83 due to the exchange coupled force between the recording magnetic film 83 and the readout magnetic film 82. When the temperature of the readout recording film 82 is reduced due to the movement of the magneto-optical recording medium 80 in the direction shown by arrow X, the magnetization in the readout magnetic film 82 changes to the in-plane magneto-anisotropy. That is, the data recorded on the recording magnetic film 83 can be reproduced only in the high temperature region 87. In the second conventional magneto-optical recording medium 80, the data can be reproduced from the recording magnetic domains 89 that are much smaller than the readout beam spot 86 without using any initializing magnetic field.

The second conventional magneto-optical recording medium using an in-plane magneto-anisotropy as the readout magnetic film 82 has an advantage that the initialization magnetic field is not required, it has the following drawback.

First, the critical temperature of the readout magnetic film 82, at which the magnetization changes from the in-plane magnetization to the perpendicular magneto-anisotropy, is constant. When a readout power of the laser beam varies, the region where the recording magnetic domains in the recording magnetic film 83 are copied to the readout magnetic film 82 is varied. Thus, the reproducing characteristics will be damaged by the interference of the wave forms. For example, when the high temperature region expands, the recording magnetic domains adjoining the specific magnetic domain to be reproduced will be included within the detection region. The reproducing characteristics are damaged by the interference of the wave forms due to the adjoining recording magnetic domains.

Second, the readout magnetic film 82 is attracted toward the recording magnetic film 83 by the exchange coupled force between the recording magnetic film 83 and the readout magnetic film 82. Thus, the readout magnetic film 82 includes the perpendicular magneto-anisotropy, and the ideal in-plane magneto-anisotropy cannot maintained. Consequently, the copying occurs in a region where the copying of the recording magnetic domains is not desired. The resolution of the readout signals from the magneto-optical recording medium will be reduced.

The above-mentioned first conventional magneto-optical recording medium does not have such problems of the second conventional magneto-optical recording medium. However, it needs the initializing magnetic field.

SUMMARY OF THE INVENTION

A first purpose of this invention are to provide a magneto-optical recording medium having high resolution of data reproduced from a middle temperature region under a readout beam spot without using any initializing magnetic field. A second purpose of this invention is to provide a method for reproducing the magneto-optical recording medium which is suitable for recording with high density.

A magneto-optical recording medium of this invention comprises: a readout magnetic film which is a perpendicular magneto-anisotropy film in a first temperature range less than a second temperature Tsw2 which is higher than the room temperature, and is an in-plane magneto-anisotropy film in a second temperature range equal to or more than the second temperature Tsw2; an intermediate magnetic film which is an in-plane magneto-anisotropy film in a third temperature range equal to or more than the room temperature; and a recording magnetic film which is a perpendicular magneto-anisotropy film and holds recording magnetic domains. When the coercive force of the readout magnetic film is Hc, the exchange coupled force between the readout magnetic film and the recording magnetic film is Hs, and the readout magnetic field is Hr, in a fourth temperature range equal to or higher than the room temperature and less than a first temperature Tsw1 which is higher than the room temperature and is lower than the second temperature Tsw2, a first relation $$|Hr| > |Hs + Hc|$$

is satisfied, and in a fifth temperature range equal to or more than the first temperature Tsw1 and less than the second temperature Tsw2, a second relation $$|Hr| < |Hs - |Hc||$$

is satisfied.

That is, the recording magnetic domains in the recording magnetic film are copied to the readout magnetic film via the intermediate magnetic film only in the fifth temperature range equal to or higher than the first temperature Tsw1 and less than the second temperature Tsw2. Consequently, the magneto-optical recording medium having high resolutional and high performing reproducing characteristics is realized without using any initializing magnetic field.

In the above-mentioned configuration of the magneto-optical recording medium, it is preferable that at least one of the readout magnetic film, the intermediate magnetic film and the recording magnetic film be formed of an amorphous material in a rare earth metal—transition metal system.

On the other hand, a method for reproducing the above-mentioned magneto-optical recording medium of this invention includes the steps of: heating the readout magnetic film to a temperature equal to or more than the second temperature Tsw2 by irradiation of reading out beam; copying the recording magnetic domains previously stored in the recording magnetic film to the readout magnetic film via the intermediate magnetic film by the exchange coupled force in the fifth temperature range equal to or more than the first temperature Tsw1 and less than the second temperature Tsw2; and readout data recorded in the recording magnetic domains by reflected light from the readout magnetic film.

DETAILED DESCRIPTION OF THE INVENTION

Figure 1:
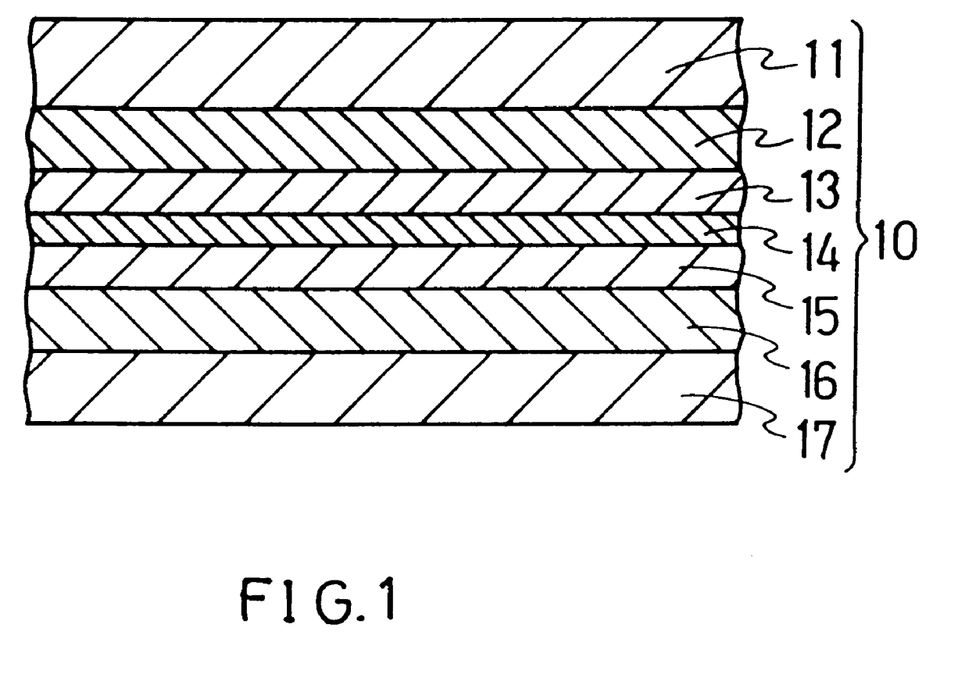
FIG. 1 is a cross-sectional side view showing a configuration of an embodiment of a magneto-optical recording medium of this invention.

An embodiment of a magneto-optical recording medium and a method for reproducing the magneto-optical recording medium of this invention is described with reference to FIGS. 1 to 3. FIG. 1 is a cross-sectional side view of a magneto-optical recording medium 10 of this invention.

As can be seen from FIG. 1, the magneto-optical recording medium 10 comprises a substrate 11, a first protection film 12, a readout magnetic film 13, an intermediate magnetic film 14, a recording magnetic film 15, a second protection film 16 and a protection layer 17. The substrate 11 is made of transparent material such as glass or plastics. The first and second protection layers 12 and 16 are made of, for example, ZnS. The readout magnetic film 13 is formed by, for example, GdFeCo film, and changes from a perpendicular magneto-anisotropy film to an in-plane magneto-anisotropy film in a (second) temperature range equal to or more than the critical temperature (second temperature) Tsw2. The intermediate magnetic film 14 is formed by, for example, GdFe, and is an in-plane magneto-anisotropy film in a (third) temperature range equal to or more than the room temperature (about 20° C.). The recording magnetic film 15 for recording data is formed by, for example, TbFeCo film, and it stores the data by perpendicular magneto-anisotropy in each recording magnetic domain. The protection layer 17 is formed of, for example, epoxy-acrylate resin.

Each magnetic film is formed on the substrate 11 by sputtering or vacuum deposition. After forming the multi-layer structure, the protection layer 17 is formed by spin coating. It is preferable that the thickness of the first and second protection films 12 and 16 be in a range from 60 to 120 nm; the thickness of the readout magnetic film 13 be in a range from 10 to 80 nm; the thickness of the intermediate magnetic film 14 be in a range from 5 to 50 nm; and the thickness of the recording magnetic film 15 be in a range from 30 to 100 nm.

A phenomenon, in which the data stored in the recording magnetic film 15 in the second temperature range equal to or more than a critical temperature or a second temperature Tsw2 is masked, is described with reference to FIGS. 2(a)

and 2(b). FIG. 2(a) is a graph showing the temperature dependence of the coercive force of the readout magnetic film 13. FIG. 2(b) is a plan view showing the temperature distribution in the vicinity of a readout beam spot 25 on a track 100 on the magneto-optical recording medium 10. In FIG. 2(b), the magneto-optical recording medium 10 moves or rotates in a direction shown by arrow A, and a recording magnetic domain 24 exists at the center of the readout beam spot 25.

Figure 2A:
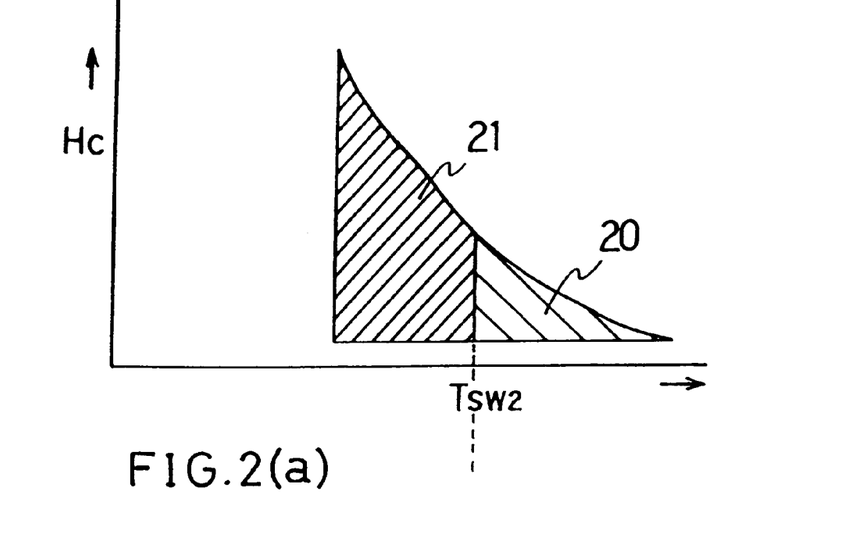
FIG. 2(a) is a graph showing the temperature dependence of coercive force of a readout magnetic film in the magneto-optical recording medium of this invention.
Figure 2B:
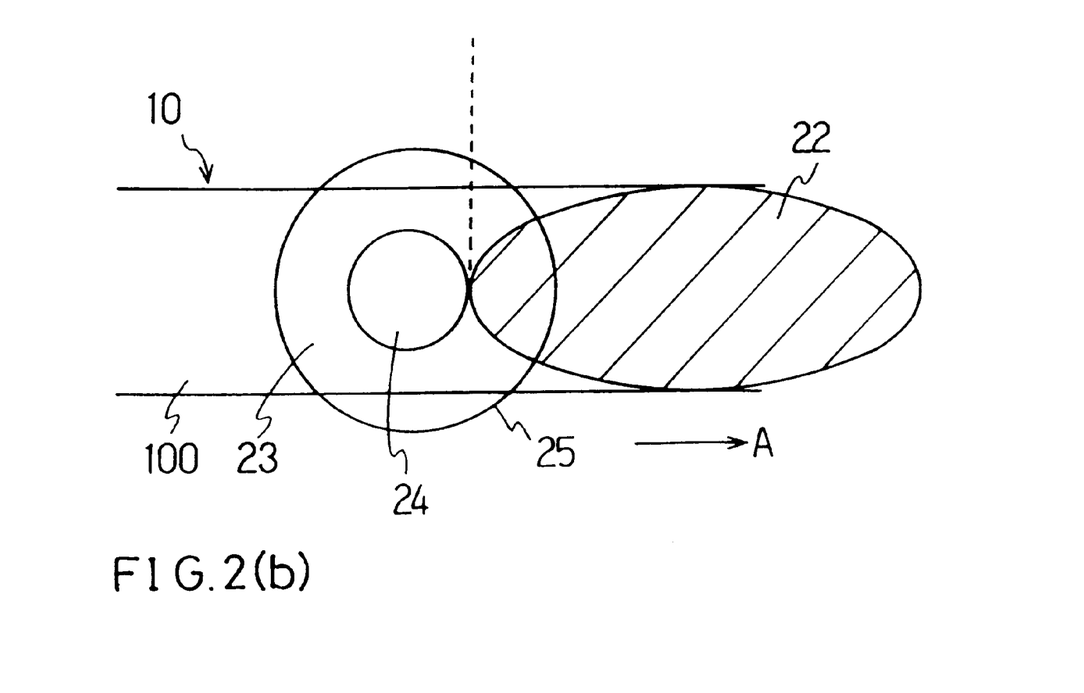
FIG. 2(b) is a plan view showing the temperature distribution in the vicinity of a readout beam spot on a track on the magneto-optical recording medium of this invention.

As can be seen from FIG. 2(b), when the readout beam spot 25 is focused on the track 100 on the rotating magneto-optical recording medium 10, the temperature distribution of each magnetic film such as the readout magnetic film 13, the intermediate magnetic film 14 or the recording magnetic film 15 becomes rotationally asymmetric in the vicinity of the track 100 on the magneto-optical recording medium 10. The center of the temperature distribution moves in the direction shown by arrow A. Specifically, an oval shaped region 22 at the rear side of the readout beam spot 25 becomes the high temperature region having the temperature equal to or more than the second temperature Tsw2.

As can be seen from FIG. 2(a), the coercive force Hc becomes smaller corresponding to the increase of the temperature. In a first temperature range less than the second temperature Tsw2, the readout magnetic film 13 is a perpendicular magneto-anisotropy film. In the second temperature range equal to or more than the second temperature Tsw2, the readout magnetic film 13 is an in-plane magneto-anisotropy film. In a region 20 designated by narrowly spaced cross-hatching in FIG. 2(a), the readout magnetic film 13 is the in-plane magneto-anisotropy film. In a region 21 designated by widely spaced cross-hatching in FIG. 2(a), the readout magnetic film 13 is the perpendicular magneto-anisotropy film. In a region 23 under the readout beam spot 25 except the overlapped portion of the oval shaped region 22 shown in FIG. 2(b), the temperature of the readout magnetic film 13 is less than the second temperature Tsw2, so that the magnetization in the readout magnetic film 13 is perpendicular magneto-anisotropy. In the oval shaped region 22, the temperature of the readout magnetic film 13 is equal to or more than the second temperature Tsw2, so that the magnetization in the readout magnetic film 13 is in-plane magneto-anisotropy.

Since the readout magnetic film 13 is the perpendicular magneto-anisotropy film in the region 23 shown in FIG. 2(b) where the temperature of the readout magnetic film 13 is less than the second temperature Tsw2, the recording magnetic domain 24 in the recording magnetic film 15 is copied to the readout magnetic film 13 due to the exchange coupled force between the recording magnetic film 15 and the readout magnetic film 13. However, since the readout magnetic film 13 in the region 22 where the temperature of the readout magnetic film 13 is equal to or more than the second temperature Tsw2 is the in-plane magneto-anisotropy film, the exchange coupled force between the recording magnetic film 15 and the readout magnetic film 13 does not act. Consequently, the data stored in the region 22 having the temperature equal to or more than the second temperature Tsw2 are masked.

Next, a phenomenon, in which the data recorded on the recording magnetic film 15 in the first temperature range having a temperature less than the second temperature Tsw2 is masked, is described with reference to FIGS. 3(a) and 3(b). FIG. 3(a) is a graph showing the temperature dependence of the amount of coercive force Hc of the readout magnetic film 13 and magnetic exchange interaction Hs acting on the readout magnetic film 13 of the magneto-optical recording medium 10. FIG. 3(b) is a plan view showing the temperature distribution in the vicinity of the readout beam spot 33 on the track 100 on the magneto-optical recording medium 10.

Figure 3A:
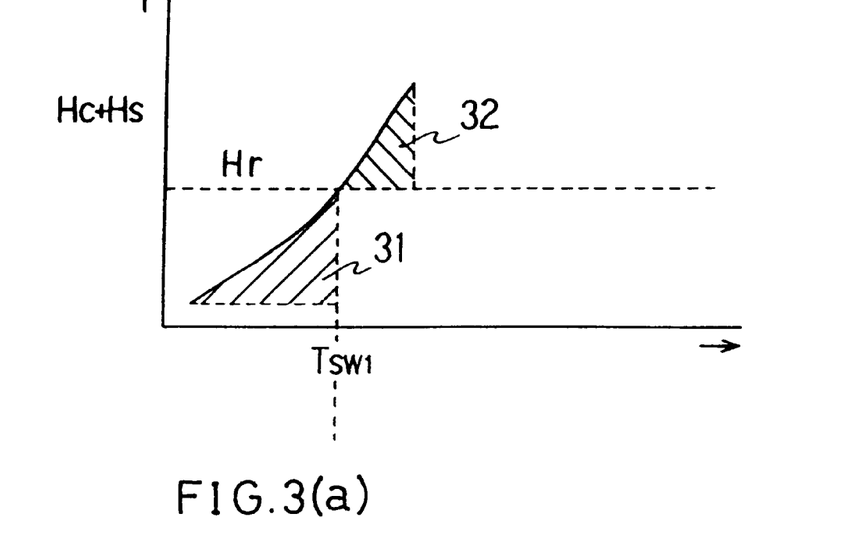
FIG. 3(a) is a graph showing the temperature dependence of the amount of coercive force and exchange coupled force of the readout magnetic film in the magneto-optical recording medium of this invention.
Figure 3B:
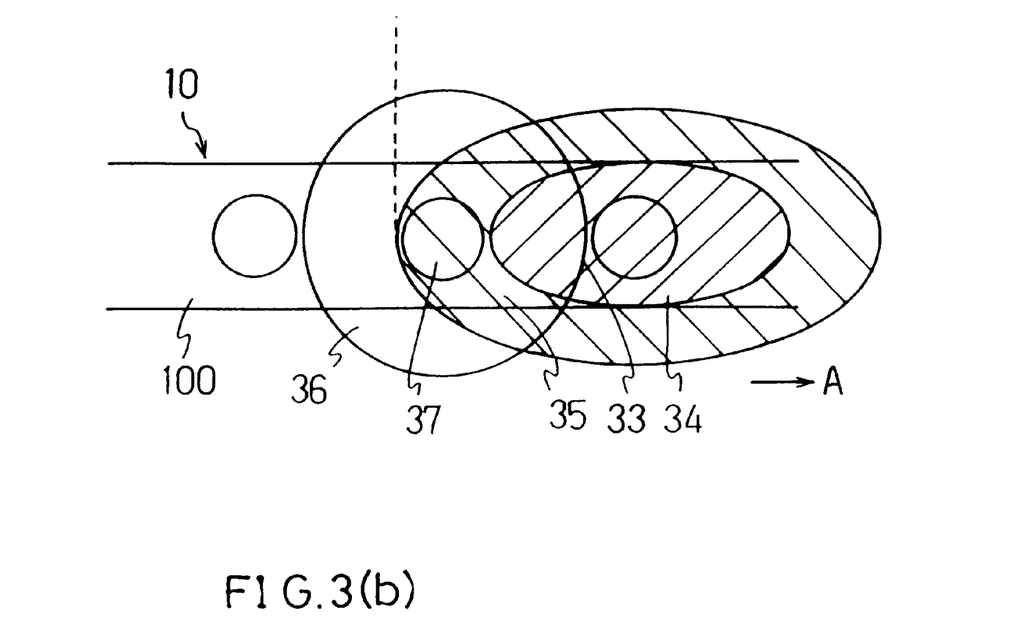
FIG. 3(b) is a plan view showing the temperature distribution in the vicinity of a readout beam spot on a track on the magneto-optical recording medium of this invention.

As can be seen from FIG. 3(b), when the readout beam spot 33 is focused on the track 100 on the rotating magneto-optical recording medium 10, the temperature distribution of each magnetic film such as the readout magnetic film 13, the intermediate magnetic film 14 or the recording magnetic film 15 becomes rotationally asymmetric in the vicinity of the track 100 on the magneto-optical recording medium 10. The center of the temperature distribution moves in a direction shown by arrow A. Specifically, an oval shaped region 34 at the rear side of the readout beam spot 33 becomes the high temperature region where the temperature of the readout magnetic film 13 becomes higher than the second temperature Tsw2. However, the temperature of the readout magnetic film 13 gradually reduces corresponding to the irradiation of the heat. At the outside of an oval shaped region 35, the temperature of the readout magnetic film 13 becomes less than a predetermined first temperature Tsw1. Thus, the temperature of the readout magnetic film 13 in a region 36 positioned outside the oval shaped region 35 and under the readout beam spot 33 becomes less than the first temperature Tsw1. Hereupon, the second temperature Tsw2 is higher than the first temperature Tsw1 (Tsw2>Tsw1).

As can be seen from FIG. 3(a), an amount |Hs+Hc| of the coercive force Hc of the readout magnetic film 13 and the exchange coupled force Hs between the readout magnetic film 13 and the recording magnetic film 15 increases corresponding to the increase of the temperature. This is because the magnetization in the intermediate magnetic film 14 reduces and influence of the exchange coupled force Hs increases corresponding to the increase of the temperature. When a readout magnetic field Hr exists, a region 31 designated by widely spaced cross-hatching in FIG. 3(a) in a fourth temperature region where the temperature is less than the first temperature Tsw1 satisfies the following formula;

$$|Hr|>Hs+Hc|.$$

Thus, the magnetization in the readout magnetic film 13 in the region 31 is oriented in the same direction as the readout magnetic field Hr.

On the other hand, in a region 32 designated by narrowly spaced cross-hatching in FIG. 3(a) where the temperature is equal to or more than the first temperature Tsw1, when the magnetization in the readout magnetic film 13 satisfies the following formula of $$|Hr|<|Hs|-|Hc|,$$

the magnetization in the readout magnetic film 13 is arranged in the same direction as that of the recording magnetic domain 37 by the exchange coupled force between the recording magnetic film 15 and the readout magnetic film 13. However, when the temperature is equal to or more than the second temperature Tsw2 which is higher than the first temperature Tsw1, the readout magnetic film 13 is the in-plane magneto-anisotropy film. Consequently, the data recorded on the recording magnetic film 15 in the region 34, where the temperature is higher than the second temperature Tsw2, is masked.

In summary, when the readout beam spot is focused on the magneto-optical recording medium, both the third temperature region where the temperature is less than the first temperature Tsw1 and the second temperature region where the temperature is equal to or more than the second temperature Tsw2 are masked. The data can be reproduced only from a fifth temperature region where the temperature is equal to or more than the first temperature Tsw1 and less than the second temperature Tsw2.

Figure 4A:
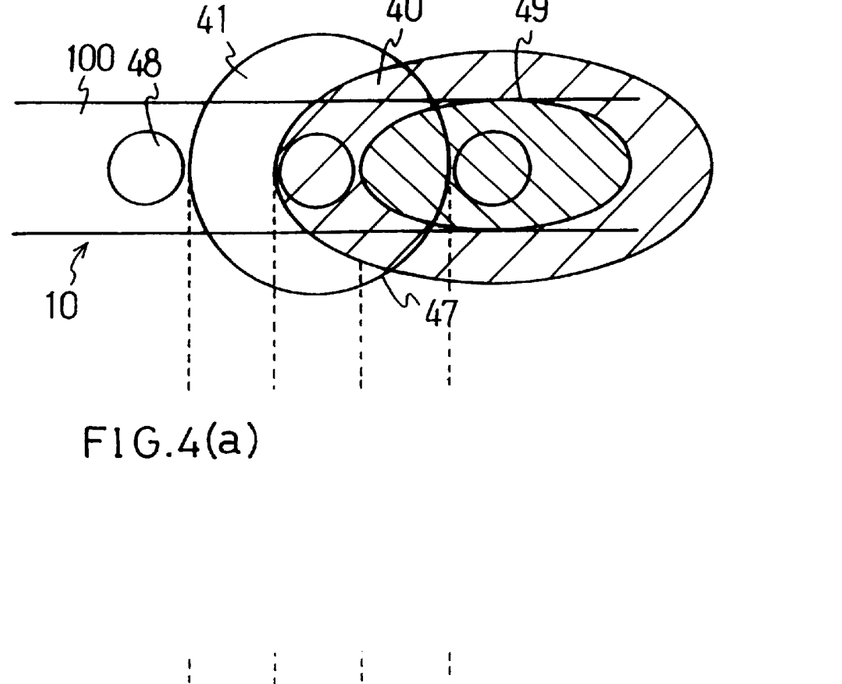
FIG. 4(a) is a plan view showing the temperature distribution in the vicinity of a readout beam spot on a track on the magneto-optical recording medium of this invention.
Figure 4B:
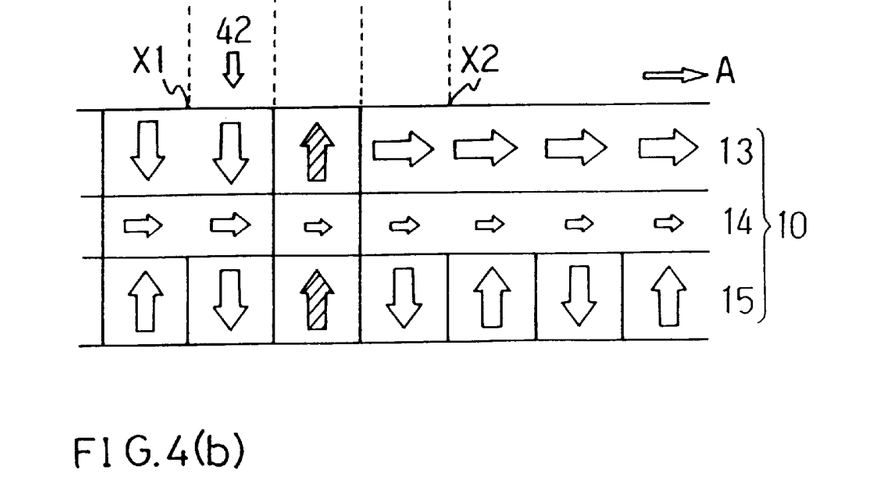
FIG. 4(b) is a cross-sectional side view showing the magnetizing distributions of respective magnetic films of the magneto-optical recording medium of this invention.

Next, the function of each magnetic film is described specifically with reference to FIGS. 4(a) and 4(b). FIG. 4(a) is a plan view showing the temperature distribution in the vicinity of a readout beam spot 47 on the track 100 on the magneto-optical recording medium 10. FIG. 4(b) is a cross-sectional side view showing the magnetizing distributions of the respective magnetic films of the magneto-optical recording medium 10. In FIG. 4(b), the magneto-optical recording medium 10 is schematically illustrated as a recording layer comprising the readout magnetic film 13, the intermediate magnetic film 14 and the recording magnetic film 15. The data are previously recorded as recording magnetic domains 48 in the recording magnetic film 15.

As can be seen from FIG. 4(a), when the readout beam spot 47 is focused on the track 100 on the rotating magneto-optical recording medium 10 that is moving or rotating in a direction shown by arrow A, the temperature distribution of each magnetic film including the readout magnetic film 13, the intermediate magnetic film 14 and the recording magnetic film 15 becomes rotationally asymmetric in the vicinity of the track 100 on the magneto-optical recording medium 10. The center of the temperature distribution moves in a direction shown by arrow A. Specifically, an oval shaped region 49 at the rear side of the readout beam spot 47 becomes the high temperature region in the second temperature range equal to or more than the second temperature Tsw2 wherein the readout magnetic film 13 changes to the in-plane magneto-anisotropy film. In the outside of the oval shaped high temperature region 49, a middle temperature region 40 in the fifth temperature range equal to or more than the first temperature Tsw1 and less than the second temperature Tsw2 and a low temperature region 41 in the fourth temperature range less than the first temperature Tsw1 are formed.

During tile readout operation, the readout beam spot 47 by the laser beam irradiates a region on the magneto-optical recording medium 10 corresponding to the recording magnetic domains from X1 to X2 shown in FIG. 4(b). Since the temperature in the low temperature region 41 is less than the first temperature Tsw1, the relation shown by the formula $|Hr|>|Hs+Hc|$ is satisfied. The magnetization in the readout magnetic film 13 is arranged in the same direction as the readout magnetic field shown by arrow 42. In the high temperature region 49, the temperature is equal to or more than the second temperature Tsw2, so that the readout magnetic film 13 changes from the perpendicular magneto-anisotropy film to the in-plane magneto-anisotropy film. Thus, both the low temperature region 41 where the temperature is less than the first temperature Tsw1 and the high temperature region 49 where the temperature is equal to or more than the second temperature Tsw2 are masked. The data of the recording magnetic domains in the recording magnetic film 15 in these regions are not copied to the readout magnetic film 13.

On the other hand, in the middle temperature region 40 in the fifth temperature range equal to or more than the first temperature Tsw1 and less than the second temperature Tsw2, the intensity of the magnetization in the intermediate magnetic film 14 is reduced as shown in FIG. 2(a). Thus, the intermediate magnetic film 14 receives the exchange coupled force due to the recording magnetic film 15 so as to change from the in-plane magneto-anisotropy to the perpendicular magneto-anisotropy. Consequently, the recording magnetic domain 48 is copied to the readout magnetic film 13 via the intermediate magnetic film 14. The data can be reproduced only from the recording magnetic domain 48 that exists in the middle temperature region 40.

Even when the high temperature region 49 expands due to the varying of the power of the readout beam spot 47, the exchange coupled force due to the recording magnetic film 15 acts only in the middle temperature region 40 having a predetermined fixed width, so that the recording magnetic domains adjoining the specific recording magnetic domain to be reproduced are not included in the detection region. Thus, when the recording magnetic domain is much smaller than the readout beam spot, the data, which are recorded in a high density, can be reproduced without being influenced by the interference due to the adjoining recording magnetic domains.

Experiment

An experimental embodiment of the magneto-optical recording medium of this invention is described. The Curie temperature Tc of the recording magnetic film 15 of the magneto-optical recording medium 10 was set to be about 250° C. so as to maintain the recording magnetic domains 24 which are thermomagnetically recorded. Each magnetic film was formed of an amorphous alloy in an rare earth metal—transition metal system.

Since the intermediate magnetic film 14 is used for controlling the exchange coupled force between the recording magnetic film 15 and the readout magnetic film 13, it must be the in-plane magneto-anisotropy film. Furthermore, the intensity of the magnetization in the intermediate magnetic film 14 reduces only in the fifth temperature range equal to or more than the first temperature Tsw1 and less than the second temperature Tsw2. The magnetization in the intermediate magnetic film 14 changes to the perpendicular magneto-anisotropy due to the exchange coupled force. The composition of the intermediate magnetic film 14 is selected from CdFeCo, GdFe, GdCo, DyFe, etc. In this embodiment, GdFe was used as the intermediate magnetic film 14.

The composition of each magnetic film of the magneto-optical recording medium 10 must satisfy the following conditions so as to be reproduced in the middle temperature region or in the fifth temperature range equal to or more than the first temperature Tsw1 and less than the second temperature Tsw2.

Generally, when a magneto-optical recording and readout apparatus is driven, the temperature in the inside of the apparatus will increase by about 50° C. with respect to the circumferential temperature. At this time, it is preferable that the first temperature Tsw1 be more than at least 80° C. so as to maintain the desired power of the readout beam spot. Similarly, it is preferable that the second temperature Tsw2 be more than 100° C.

On the other hand, if the second temperature (critical temperature) Tsw2 were higher than the Curie temperature Tc of the recording magnetic film 15, the recording magnetic domains in the recording magnetic film 15 would be damaged in the readout operation. Thus, the second temperature Tsw2 must be lower than the Curie temperature Tc of the recording magnetic film 15. It is preferable that the Curie temperature Tc of the recording magnetic film 15 be in a range from 200° C. to 300° C. Furthermore, it is preferable that the second temperature Tsw2 be in a range from 100° C. to 250° C. As a result of the experiment, the compositional ratio of Gd was in a range from 15% to 25%.

In order to increase the quality of the readout signals, it is preferable that the second temperature Tsw2 be higher in a permitted temperature range. Specifically, it is preferable that the second temperature Tsw2 be in a range from 170° C. to 250° C., and the compositional ratio of Gd be in a range from 18% to 23%. In the actual magneto-optical recording medium 10, the first temperature Tsw1 was 80° C., the second temperature Tsw2 was 200° C. the composition of the readout magnetic film 13 was $Gd_{18}Fe_{68}Co_{14}$, and the composition of the intermediate magnetic film 14 was $Gd_{40}Fe_{60}$.

In the above-mentioned embodiment, ZnS film was used as the material of the first and second protection films 12 and 16. Instead of ZnS film, a chalcogen film, an oxide film such as $TaO_2$, a nitride film such as SiN, or a compound film of them can be used.

Furthermore, GdFeCo, GdFe and TbFeCo films were respectively used as the materials of the readout magnetic film 13, the intermediate magnetic film 14 and the recording magnetic film 15. However, as a material of each magnetic film, a ferrimagnetic film in a rare earth metal—transition metal system, a magnetic film in Mn system such as MnBiAl, etc can be used.

Furthermore, an epoxy-acrylate system resin was used as the material of the protection layer 17. Instead of forming the protection layer 17, it is preferable that another substrate be adhered on a surface of the multi-layer structure opposing the substrate 11 by a resin of a urethane system or a hotmelt adhesive.

Still furthermore, the recording layer was constituted by the readout magnetic film 13, the intermediate magnetic film and the recording magnetic film 15. However, it is preferable that another in-plane magneto-anisotropy film or perpendicular magneto-anisotropy film be provided between these magnetic films.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A magneto-optical recording medium comprising: a readout magnetic film which is a perpendicular magneto-anisotropy film in a first temperature range less than a second temperature Tsw2 which is higher than room temperature, and is an in-plane magneto-anisotropy film in a second temperature range equal to or more than the second temperature Tsw2; an intermediate magnetic film which is an in-plane magneto-anisotropy film in a third temperature range equal to or more than the room temperature; and a recording magnetic film which is a perpendicular magneto-anisotropy film and holds recording magnetic domains; wherein when a coercive force of the readout magnetic film is Hc, a exchange coupled force between the readout magnetic film and the recording magnetic film is Hs, and a readout magnetic field is Hr, in a fourth temperature range equal to or higher than room temperature and less than a first temperature Tsw1 which is higher than room temperature and is lower than the second temperature Tsw2, a first relation $$|Hr|>|Hs+Hc|$$

is satisfied, and in a fifth temperature range equal to or more than the first temperature Tsw1 and less than the second temperature Tsw2, a second relation $$|Hr|<|Hs|-|Hc|$$

is satisfied.

2. The magneto-optical recording medium in accordance with claim 1, wherein at least one of the readout magnetic film, the intermediate magnetic film and the recording magnetic film is formed by rare earth metal—transition metal amorphous alloy.

3. A method for reproducing from a magneto-optical recording medium, the recording medium comprising: a readout magnetic film which is a perpendicular magneto-anisotropy film in a first temperature range less than a second temperature Tsw2 which is higher than room temperature, and is an in-plane magneto-anisotropy film in a second temperature range equal to or more than the second temperature Tsw2; an intermediate magnetic film which is an in-plane magneto-anisotropy film in a third temperature range equal to or more than room temperature; and a recording magnetic film which is a perpendicular magneto-anisotropy film and holds recording magnetic domains; wherein when a coercive force of the reproducing magnetic film is Hc, a exchange coupled force between the readout magnetic film and the recording magnetic film is Hs, and a readout magnetic field is Hr, in a fourth temperature range equal to or higher than room temperature and less than a first temperature Tsw1 which is higher than room temperature and is lower than the second temperature Tsw2, a first relation $$|Hr|<|Hs+Hc|$$

is satisfied, and in a fifth temperature range equal to or more than the first temperature Tsw1 and less than the second temperature Tsw2, a second relation $$|Hr|<|Hs-Hc|$$

is satisfied; the method comprising the steps of:

heating the readout magnetic film to a temperature equal to or more than the second temperature Tsw2 by irradiation of readout beam;

transcribing the recording magnetic domains previously stored in the recording magnetic film to the readout magnetic film via the intermediate magnetic film by exchange coupled force in a temperature range equal to or more than the first temperature Tsw1 and less than the second temperature Tsw2; and reproducing datum recorded in each recording magnetic domain by reflected light from the readout magnetic film.

* * * * *